United States Patent
Fiset et al.

(10) Patent No.: US 11,921,867 B2
(45) Date of Patent: Mar. 5, 2024

(54) DIGITAL DATA COMPARISON FILTER, SYSTEM AND METHOD, AND APPLICATIONS THEREFOR

(71) Applicant: CRYPTO4A TECHNOLOGIES INC., Gatineau (CA)

(72) Inventors: Jean-Pierre Fiset, Ottawa (CA); Bruno Couillard, Gatineau (CA); Bradley Clare Ritchie, Kemptville (CA); James Ross Goodman, Ottawa (CA)

(73) Assignee: CRYPTO4A TECHNOLOGIES INC., Gatineau (CA)

( * ) Notice: Subject to any disclaimer, the term of this patent is extended or adjusted under 35 U.S.C. 154(b) by 587 days.

(21) Appl. No.: 17/052,962

(22) PCT Filed: May 2, 2019

(86) PCT No.: PCT/CA2019/050577
§ 371 (c)(1),
(2) Date: Nov. 4, 2020

(87) PCT Pub. No.: WO2019/210418
PCT Pub. Date: Nov. 7, 2019

(65) Prior Publication Data
US 2021/0133333 A1  May 6, 2021

Related U.S. Application Data

(60) Provisional application No. 62/666,892, filed on May 4, 2018.

(51) Int. Cl.
*G06F 21/60* (2013.01)
*H04L 9/08* (2006.01)

(52) U.S. Cl.
CPC .......... *G06F 21/602* (2013.01); *H04L 9/0861* (2013.01); *H04L 9/0894* (2013.01)

(58) Field of Classification Search
CPC ... G06F 21/602; H04L 9/0861; H04L 9/0894; H04L 2209/46; H04L 9/085; H04L 9/3236; H04L 9/50
See application file for complete search history.

(56) References Cited

U.S. PATENT DOCUMENTS 5,400,248 A * 3/1995 Chisholm .............. G07C 13/00
 235/386
7,627,753 B2 12/2009 Whitten et al.
(Continued)

FOREIGN PATENT DOCUMENTS

| EP | 2521088 A1 | 11/2012 |
| JP | 4738003 B2 | 8/2011 |
| KR | 101648078 B1 | 8/2016 |

OTHER PUBLICATIONS

Extended European Search Report dated Dec. 21, 2021 for European Patent Application No. 19795792.1. 14 pages.
(Continued)

*Primary Examiner* — Henry Tsang
(74) *Attorney, Agent, or Firm* — Knobbe, Martens, Olson & Bear, LLP (57) ABSTRACT

Described are various embodiments of a digital data comparison filter, system and method, and applications therefor. In one embodiment, a digital data comparator system comprises two or more transformation engines each having securely stored in association therewith a common key, a common designated comparator threshold number, and a respective identifier; and a reconstitution engine operable to access partial encryption information from each transformation engine and, only upon relating to identical digital data, process each partial encryption information to successfully release the identical digital data.

22 Claims, 7 Drawing Sheets

(56) References Cited

U.S. PATENT DOCUMENTS

| | | |
|---|---|---|
| 8,671,109 B2 | 3/2014 | Gupta et al. |
| 8,831,760 B2 | 9/2014 | Gupta et al. |
| 10,225,092 B2 | 3/2019 | Kanda et al. |
| 2003/0182574 A1 | 9/2003 | Whitten et al. |
| 2011/0082877 A1 | 4/2011 | Gupta et al. |
| 2012/0143915 A1 | 6/2012 | Gupta et al. |
| 2015/0067331 A1* | 3/2015 | Jelitto ............... H04L 63/0428 713/168 |
| 2016/0342814 A1* | 11/2016 | Wang ................. H04L 9/0894 |
| 2017/0070359 A1 | 3/2017 | Kanda et al. |
| 2018/0054316 A1* | 2/2018 | Tomlinson ........... H04L 63/061 |
| 2019/0068366 A1* | 2/2019 | Guajardo Merchan .................... H04L 9/0643 |
| 2019/0327085 A1* | 10/2019 | Patel ................. H04W 12/02 |

OTHER PUBLICATIONS

Bjelland, P.C. et al., "Practical use of Approximate Hash Based Matching in digital investigations", Digital Investigation, vol. 11, May 2014, pp. S18-S26, May 1, 2014.

Brin, S. et al., "Copy detection mechanisms for digital documents", Proceedings of the 1995 ACM SIGMOD International conference on Management of data, SIGMOD '95, San Jose, California, USA May 22-25, 1995, pp. 398-409, May 22, 1995.

Hoad, T.C. et al., "Methods for identifying versioned and plagiarized documents", Journal of the American society for information science and technology, vol. 54, issue 3, pp. 203-215, Feb. 1, 2003.

International Search Report issued in respect of counterpart International Application No. PCT/CA2019/050577 dated Jul. 31, 2019.

Written Opinion issued in respect of counterpart International Application No. PCT/CA2019/050577, dated Jul. 31, 2019.

\* cited by examiner

DIGITAL DATA COMPARISON FILTER, SYSTEM AND METHOD, AND APPLICATIONS THEREFOR

CROSS REFERENCE TO RELATED APPLICATION

This application the U.S. National Phase Application under 35 U.S.C. § 371 of International Application No. PCT/CA2019/050577, filed May 2, 2019, which claims the benefit of priority to U.S. Provisional Patent Application No. 62/666,892, filed May 4, 2018 and entitled "Trusted Digital Data Comparison Filter, System and Method, and Applications Therefor" which is incorporated by reference herein in its entirety.

FIELD OF THE DISCLOSURE

The present disclosure relates to data security, and, in particular, to a digital data comparison filter, system and method, and applications therefor.

BACKGROUND

Various systems and methods are known to manage data traffic across the boundary of two security zones in which different security policies may apply. For example, secured data in a higher security zone may only be released to another lower security zone, for instance, upon certain conditions being met. When such conditions are met, the secured data may become available to an actor in the receiving security zone, for instance, through a successfully applied data decryption process, for example. On the other hand, where those conditions are not met, the secured data remains unavailable in a useful form, e.g. data decryption fails or merely returns an error code.

This background information is provided to reveal information believed by the applicant to be of possible relevance. No admission is necessarily intended, nor should be construed, that any of the preceding information constitutes prior art or forms part of the general common knowledge in the relevant art.

SUMMARY

The following presents a simplified summary of the general inventive concept(s) described herein to provide a basic understanding of some aspects of the disclosure. This summary is not an extensive overview of the disclosure. It is not intended to restrict key or critical elements of embodiments of the disclosure or to delineate their scope beyond that which is explicitly or implicitly described by the following description and claims.

A need exists for trusted digital data comparison filter that overcomes some of the drawbacks of known techniques, or at least, provides a useful alternative thereto. Some aspects of this disclosure provide examples of a trusted digital data comparison filter, system, method, and applications therefor.

In accordance with one aspect, there is provided a trusted secure digital data comparator for processing separate digital data inputs, the comparator comprising: two or more transformation engines each having stored in association therewith a common key and a respective identifier, wherein each of said transformation engines is operable to receive as input and encrypt a respective one of the separate digital data inputs using an encryption key derived from said common key and said respective one of the separate digital data inputs, and output an encrypted copy of said respective one of the separate digital data inputs and partial encryption information associated with said respective identifier and representative of said encryption key; a reconstitution engine operable to access each said encrypted copy and said partial encryption information, wherein said reconstitution engine is operable, only upon a designated threshold number of said separate digital data inputs representing identical digital data, to simultaneously process each said partial encryption information given each said respective identifier associated therewith to extract said encryption key and thereby successfully decrypt said identical digital data.

In accordance with another aspect, there is provided a trusted digital consensus verification system comprising: respective transformation engines each having stored in association therewith a common key and a respective identifier, wherein each of said transformation engines is operable to receive as input and encrypt a respective digital data input version using an encryption key derived from said common key and said respective digital data input version, and output an encrypted copy of said respective digital data input version and partial encryption information associated with said respective identifier and representative of said encryption key; a reconstitution engine operable to access each said encrypted copy and said partial encryption information, wherein said reconstitution engine is operable, only upon a designated threshold number of said digital data input versions representing an identical digital data version, to simultaneously process each said partial encryption information given each said respective identifier associated therewith to extract said encryption key and thereby successfully decrypt said identical digital data version.

In accordance with another aspect, there is provided a digital data comparator system for processing separate digital data inputs, the system comprising: two or more transformation engines each having securely stored in association therewith a common key, a common designated comparator threshold number, and a respective identifier, wherein each of said transformation engines is operable to: receive as input and encrypt a respective one of the separate digital data inputs using an encryption key derived from said common key, said common designated comparator threshold value and said respective one of the separate digital data inputs, and output partial encryption information associated with said encryption key and said respective identifier; and a reconstitution engine operable to access each said partial encryption information, wherein said reconstitution engine is operable, only upon said common designated comparator threshold number of the separate digital data inputs representing identical digital data, to: process each said partial encryption information given each said respective identifier associated therewith to extract said encryption key; and thereby successfully release said identical digital data.

In one embodiment, each of said transformation engines is further operable to output a message authentication code representative of said respective one of the separate digital data inputs, and wherein said reconstitution engine is further operable to count access to identical message authentication codes and only process each said partial encryption information upon said count reaching said common designated comparator threshold number.

In one embodiment, the reconstitution engine is operable to process each of said common designated comparator threshold number of said partial encryption information while only processing a single said encrypted copy commonly associated therewith for release.

In one embodiment, the encryption key comprises a symmetric key derived via a designated secret sharing protocol.

In one embodiment, the designated secret sharing protocol comprises Shamir's secret sharing protocol.

In one embodiment, the common key comprises a pre-placed key (PPK).

In one embodiment, the PPK is previously established between each of said two or more transformation engines via a designated group key agreement protocol.

In one embodiment, the reconstitution engine comprises a stateless engine such that said identical digital data remains encrypted and thereby inaccessible to and via said reconstitution engine unless said common designated comparator threshold number is satisfied.

In one embodiment, the system is operable between a higher digital security zone and a lower digital security zone, wherein each of said transformation engines receives one of the separate digital data inputs from within the higher digital security zone, and wherein said reconstitution engine is operable to release said identical digital data, once decrypted, to the lower digital security zone.

In one embodiment, the common designated comparator threshold number is designated to represent a majority amongst said distinct transformation engines and the separate digital data inputs.

In one embodiment, the separate digital data inputs are representative of respective digital votes such that said reconstitution engine releases a majority vote outcome only upon said majority being satisfied.

In one embodiment, the threshold number is designated to represent unanimity amongst said distinct transformation engines and the separate digital data inputs.

In one embodiment, the separate digital data inputs are representative of respective digital votes such that said transformation engine releases a unanimous vote outcome only upon said unanimity being satisfied.

In one embodiment, the two or more transformation engines and said reconstitution engine are defined by machine executable instructions stored in one or more non-transitory computer-readable media that, when executed by a digital data processor, implement computer-executable functions thereof.

In accordance with another aspect, there is provided a computer-implemented process, to be automatically implemented by a hardware digital data processor, to digitally compare separate digital data inputs, the process comprising: for each of two or more distinctly implemented transformation processes: receiving as input a respective one of the separate digital data inputs; encrypting said respective one of the separate digital data inputs using an encryption key derived from a common key, a common designated comparator threshold value and said respective one of the separate digital data inputs; and outputting partial encryption information associated with said encryption key and said respective identifier; and only upon said common designated comparator threshold number of the separate digital data inputs representing identical digital data, reconstituting said identical digital data by: processing each said partial encryption information given each said respective identifier associated therewith to extract said encryption key; and releasing said identical digital data using said extracted encryption key.

In one embodiment, each of said transformation processes further comprises outputting a respective message authentication code representative of said respective one of the separate digital data inputs, and wherein said reconstituting further comprises, prior to said processing, counting identical message authentication codes until said count reaches said common designated comparator threshold number.

In one embodiment, the process further comprises establishing said common key via a designated group key agreement protocol.

In one embodiment, each of said transformation processes are implemented within a higher network security zone; and wherein said reconstituting releases said identical digital data to a lower network security zone.

In one embodiment, the common designated comparator threshold number is designated to represent one of a majority or a unanimity amongst the separate digital data inputs.

In accordance with another aspect, there is provided a trusted digital consensus verification system comprising: respective transformation engines each having stored in association therewith a common key and a respective identifier, wherein each of said transformation engines is operable to: receive as input and encrypt a respective digital data input version using an encryption key derived from said common key and said respective digital data input version, and output partial encryption information associated with said encryption key and said respective identifier; and a reconstitution engine operable to access each said partial encryption information, wherein said reconstitution engine is operable, only upon each of said digital data input versions being accessed and representing an identical digital data version, to: process each said partial encryption information given each said respective identifier associated therewith to extract said encryption key; and thereby verify consensus to release said identical digital data version.

In one embodiment, the respective transformation engines output to a public blockchain, and wherein said reconstitution engine has access to said public blockchain to access each said partial encryption information therefrom and release said identical digital data version thereto or therefrom.

In one embodiment, each said respective digital data input version is representative of a digital contract version.

In one embodiment, the respective digital data input version is representative of a digital vote, identity or authentication.

In one embodiment, the encryption key comprises a symmetric key derived via a designated secret sharing protocol.

In one embodiment, the designated secret sharing protocol comprises Shamir's secret sharing protocol.

In one embodiment, the common key comprises a pre-placed key (PPK) previously established between each of said respective transformation engines via a designated group key agreement protocol.

In accordance with another aspect, there is provided a computer-implemented trusted digital consensus verification process, to be automatically implemented by a digital data processor, comprising: for each of respective distinctly implemented transformation processes: receiving as input a respective digital data input version; encrypting said respective digital data input version using an encryption key derived from a common key and said respective digital data input version, and outputting partial encryption information associated with said encryption key and said respective identifier; and only upon each of said digital data input versions representing an identical digital data version: processing each said partial encryption information given each said respective identifier associated therewith to extract said encryption key; and verifying said consensus to release said identical digital data version accordingly.

In accordance with another aspect, there is provided a trusted data encryption system, comprising: two or more machine-executable transformation engines each having securely stored in association therewith: a common key, a common designated comparator threshold number, and a respective identifier; wherein each of said transformation engines is operable on respective digital data inputs to: derive an encryption key from said common key, said common designated comparator threshold value and one of said respective digital data inputs; encrypt said respective digital data input using said encryption key, and output partial encryption information associated with said encryption key and said respective identifier; such that, only upon said common designated comparator threshold number of said respective digital data inputs representing identical digital data, said identical digital data can be decrypted and thereby successfully released by processing each said partial encryption information given each said respective identifier respectively associated therewith.

In one embodiment, the encryption key comprises a symmetric key derived via a designated secret sharing protocol securely implemented between said two or more transformation engines.

In one embodiment, the designated secret sharing protocol comprises Shamir's secret sharing protocol.

In one embodiment, the common key comprises a preplaced key (PPK).

In one embodiment, the transformation engines are further operable to establish said PPK therebetween via a designated group key agreement protocol.

In one embodiment, the common designated comparator threshold number is designated to represent a majority amongst said two or more transformation engines and said respective digital data inputs.

In one embodiment, the respective digital data inputs are representative of respective digital votes such a majority vote outcome can only be released upon said majority being satisfied.

In one embodiment, the threshold number is designated to represent unanimity amongst said transformation engines and said respective digital data inputs.

In one embodiment, the respective digital data inputs are representative of respective digital votes such a unanimous vote outcome can only be released upon said unanimity being satisfied.

In one embodiment, the two or more transformation engines are defined by machine executable instructions stored in one or more non-transitory computer-readable media that, when executed by a digital data processor, implement computer-executable functions thereof.

In one embodiment, at least two of said transformation engines are operated within a common hardware-integrated security appliance comprising a respective hardware-segregated input port for each of said transformation engines operable in hardware to receive said one of said respective digital data inputs thereon for transformation.

In one embodiment, the system further comprises a reconstitution engine operable to process each said partial encryption information given each said respective identifier associated therewith to extract said encryption key and thereby successfully release said identical digital data.

In accordance with another aspect, there is provided a computer-implemented trusted data encryption process, to be automatically implemented by a digital data processor, comprising: for each of two or more distinctly implemented transformation processes, each having associated therewith a common key, a common designated comparator threshold number and a respective identifier: receiving as input a respective digital data input; deriving an encryption key from said common key, said common designated comparator threshold value and said respective digital data input; encrypting said respective digital data input using said encryption key; and outputting partial encryption information associated with said encryption key and said respective identifier such that, only upon said common designated comparator threshold number of said respective digital data inputs representing identical digital data, said identical digital data can be decrypted and thereby successfully released by processing each said partial encryption information given each said respective identifier respectively associated therewith.

Other aspects, features and/or advantages will become more apparent upon reading of the following non-restrictive description of specific embodiments thereof, given by way of example only with reference to the accompanying drawings.

BRIEF DESCRIPTION OF THE FIGURES

Several embodiments of the present disclosure will be provided, by way of examples only, with reference to the appended drawings, wherein.

Elements in the several figures are illustrated for simplicity and clarity and have not necessarily been drawn to scale. For example, the dimensions of some of the elements in the figures may be emphasized relative to other elements for facilitating understanding of the various presently disclosed embodiments. Also, common, but well-understood elements that are useful or necessary in commercially feasible embodiments are often not depicted in order to facilitate a less obstructed view of these various embodiments of the present disclosure.

DETAILED DESCRIPTION

Various implementations and aspects of the specification will be described with reference to details discussed below.

The following description and drawings are illustrative of the specification and are not to be construed as limiting the specification. Numerous specific details are described to provide a thorough understanding of various implementations of the present specification. However, in certain instances, well-known or conventional details are not described in order to provide a concise discussion of implementations of the present specification.

Various apparatuses and processes will be described below to provide examples of implementations of the system disclosed herein. No implementation described below limits any claimed implementation and any claimed implementations may cover processes or apparatuses that differ from those described below. The claimed implementations are not limited to apparatuses or processes having all of the features of any one apparatus or process described below or to features common to multiple or all of the apparatuses or processes described below. It is possible that an apparatus or process described below is not an implementation of any claimed subject matter.

Furthermore, numerous specific details are set forth in order to provide a thorough understanding of the implementations described herein. However, it will be understood by those skilled in the relevant arts that the implementations described herein may be practiced without these specific details. In other instances, well-known methods, procedures and components have not been described in detail so as not to obscure the implementations described herein.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" may be construed as X only, Y only, Z only, or any combination of two or more items X, Y, and Z (e.g., XYZ, XY, YZ, ZZ, and the like). Similar logic may be applied for two or more items in any occurrence of "at least one . . . " and "one or more . . . " language.

The systems and methods described herein provide, in accordance with different embodiments, different examples of a trusted digital data comparison filter, system, method and applications therefor.

In general, a filter, as defined herein, refers to a function where information, in the form of computer data, is presented as an input and is allowed to traverse to an output based on whether or not it satisfies a specified condition. The filter does not modify the information during this transition; it rather decides whether or not the information can traverse to the output based on the specified condition. The condition used by a filter can also be referred to as a test. In some designs, the output of the filter can be an error code of some sort if the condition does not allow the traversal to occur.

A Trusted Filter, as defined herein, generally performs the same function as a regular filter, but operates across the boundary of two security zones such that the input and output adhere to different security policies. In operation, the design of the Trusted Filter should generally meet the assurance requirements for operating between the security zones. In some examples, whether or not a Trusted Filter emits an error code when information is prevented from the transition is based on the security policies of the environment.

Figure 1:
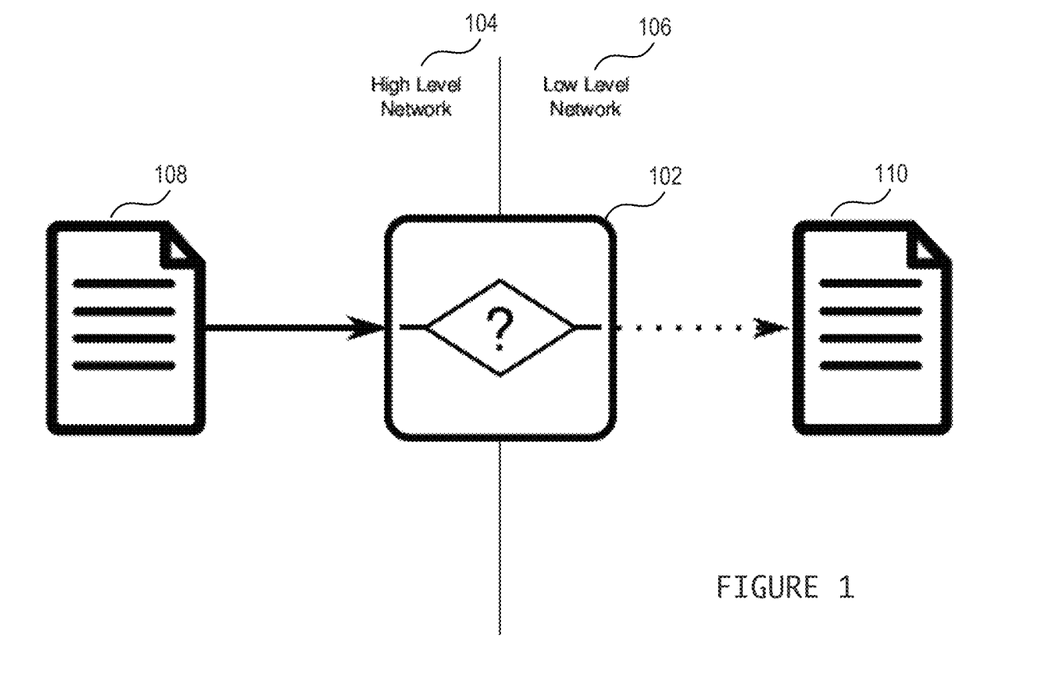
FIG. 1 is a diagram of a trusted digital data filter, in accordance with one embodiment.

With reference to FIG. 1, and in accordance with one embodiment, a trusted digital data filter 102 is shown to operate between a high level security network 104 and a low level security network 106, wherein secured digital data 108 received at the input of the filter 102 is only successfully made available at the output 110 upon meeting the conditions imposed by the filter 102. This may, for example, take the form of a successful data decryption, transmission and/or the like. Otherwise, the secured data 108 will remain unavailable, or at least unavailable in useable form, at the output 110.

It will be appreciated that while a trusted digital data filter may be implemented between different data security zones or networks, as shown in FIG. 1, other applications may also be considered without necessarily invoking such different data security zones or networks.

A Comparison Filter, as defined herein, is generally designed to accept information on multiple inputs. The condition tested by the filter is that a number of inputs, for example meeting some apriori-defined threshold, be identical before releasing the information to its output. This component is useful, for example, in systems enforcing redundancy.

A Trusted Comparison Filter (TCF), as defined herein, generally consists of a comparison filter which bridges security zones. There are a number of applications for a Trusted Comparison Filter. For example, in a system used to declassify information from a secure network, a TCF can be used to bridge between the secure network and another one of a lesser caveat. Generally, the inputs presented to the comparator are computed by different processes, and only if all processes agree on the outcome/output is the data released to the lower security network. This strategy is used to ensure that an error in one process does not result in an inadvertent release by requiring that multiple processes reach the same conclusion regarding the input's suitability for release.

Hence, systems designed with high assurance in mind can use a TCF with several inputs, requiring a quorum before release.

Figure 2:
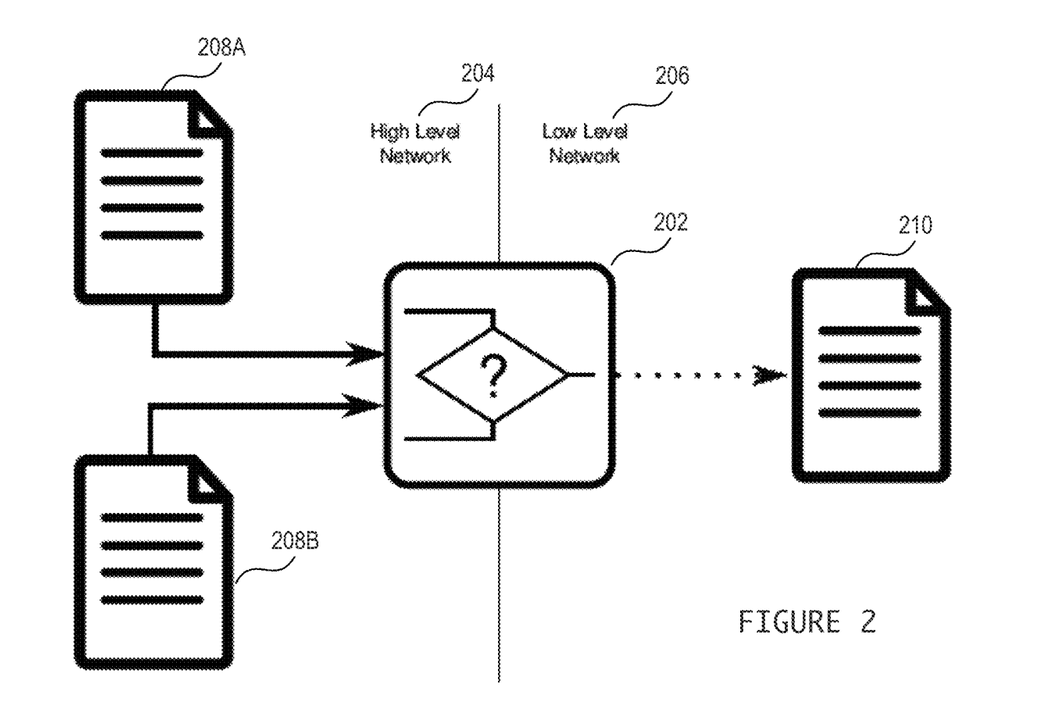
FIG. 2 is a diagram of a trusted digital data comparison filter, in accordance with one embodiment.

With reference to FIG. 2, and in accordance with one embodiment, a Trusted Digital Data Comparison Filter 202 is again shown to operate between a high level security network 204 and a low level security network 206. In this example, digital data 208A and 208B presented at distinct (two or more) high level network filter inputs is only successfully output 210 to the low level security network 206 upon the filter 202 successfully determining that both inputs 208A and 208B are identical. Other comparative tests and results may also be considered and predetermined to define a successful outcome.

It will be appreciated that while a TCF may be implemented between different data security zones or networks, as shown in FIG. 2, other applications may also be considered without necessarily invoking such different data security zones or networks.

While useful, a TCF as defined above can encounter certain issues. For example, the filter doing the comparison (i.e., the comparator) will generally retain enough information about one of the inputs to compare with the other inputs, forcing some amount of state to be retained within the comparator.

The state information will also generally remain available within the comparator long enough that all of the input information can be checked against it. Hence, large latencies might force an increase in the amount of state needed by the comparator to meet the expected throughput.

Further, all generated inputs must generally be co-located with the comparator. Since the comparator holds the state of the comparison, ultimately all inputs will be compared against this state.

Figure 3:
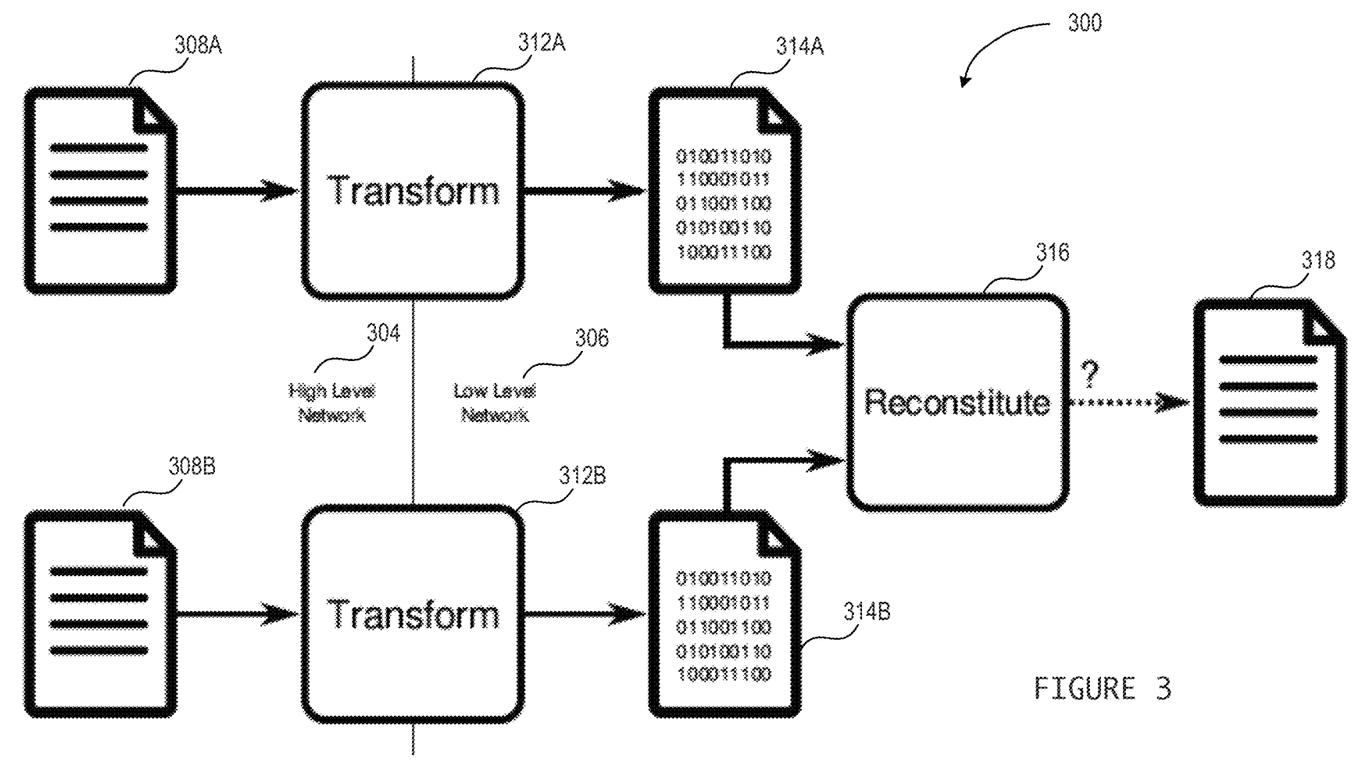
FIG. 3 is a diagram of a Stateless Trusted digital data Comparison Filter (STCF), in accordance with one embodiment.

With reference to FIG. 3, and in accordance with one embodiment, a Stateless TCF (STCF), generally referred to using the numeral 300, will now be described that addresses at least some of the above-noted issues. As in the examples noted above, the STCF 300 is generally configured and operatively disposed to control transfer of secure information from a higher security level network 304 to a lower security level network 306, in this case only upon distinctly sourced data 308A and 308B satisfying a designated comparative relationship, for example, that both are identical.

In the illustrated embodiment, cryptographic operations can be used to transform incoming data 308A and 308B into respective encrypted copies (314A, 314B), e.g. via respective transformation engines 312A, 312B, before being released to the lower security level network 306 or target security zone. As illustrated in this embodiment, the encryption or transformation process is performed independently on each input 308A, 308B, and in some examples, can be performed on different physical devices provided those devices share a pre-placed key (PPK) or like cryptographic parameters used to perform the data encryption.

Different secure methods may be considered for initially distributing the PPK (or like cryptographic information/parameters). For example, the embodiments illustratively described herein contemplate the pre-distribution of the PPK (i.e. secret piece of information) to each node before they can claim to be a contributing member to the process. Another way to set this initial condition would be to use a group key agreement scheme where each party is involved in generating the secret material used to generate the voting/consensus shares. Other approaches may also be considered.

In order to adhere to high data security protocols, such cryptographic engines, appliances or devices should also include a number of security features and functions to minimize the likelihood of tampering or foul play. An exemplary device amenable to providing such features is described in co-pending international application publication no. WO 2018/218349 filed May 30, 2018, the entire contents of which are hereby incorporated herein by reference. For instance, in one embodiment, each transformation and/or reconstitution engine/device may take the form of a secure encryption/decryption device, such as a hardware security module (HSM) or the like. In some examples, a suitable HSM may be configured and operable to concurrently service multiple applications and/or functions while minimizing system security risks that may otherwise be introduced when interfacing with a traditional HSM via an intermediary HSM access appliance or application layer.

For instance, in some embodiments, the HSM comprises a plurality of hardware ports, each one configured or reconfigurable to receive an input (e.g. source data) thereon to execute a designated cryptographic process (e.g. source or port-specific transformation and encryption) within the HSM in servicing a particular transformation/reconstitution process, application or function. In general, received input data can be port-specific in that only input cryptographic data specific to the port on which it is received can be successfully processed. To do so, each hardware port will generally have defined in association therewith a corresponding hardware link or channel (e.g. static and/or reconfigurable hardware link, channel and/or switch) to a segregated hardware storage media that stores secured port-specific cryptographic data thereon exclusively retrievable for processing as a function of received input data specific to that hardware port. For example, distinct embedded storage resources may be provided with respective hardware data links to their corresponding port, as can distinct storage partitions and/or zones be defined within a same embedded memory storage resource and accessed via dedicated hardware logic or the like. An integrated cryptographic engine, executed by an embedded or hardware linked processor, can then be invoked to internally process the retrieved secured cryptographic data, for instance in conjunction with the input data, to produce an intended computation result.

Accordingly, the entire process can be relegated to the hardware space without invoking a software or application layer and thus, without opening the HSM to tampering opportunities that may otherwise present themselves in conventional HSMs, such as traditional network-attached HSMs. Conversely, the HSM may allow for a full, and in some embodiments a single-chip (i.e. static or reconfigurable (e.g. FPGA)) hardware solution that can be used to concurrently service multiple applications and/or processes from within a same tamper-resistant environment.

In that respect, it will be appreciated that while distinct transformation and/or reconstitution devices may be considered to implement the herein-described embodiments, a single cryptographic engine may otherwise be considered, for example, to separately invoke the different cryptographic processes described herein, which, when implement using an HSM as noted above, can each be processed in a secure and segregated manner with reduced, if not mostly entirely suppressed security risks.

Furthermore, some or all of the cryptographic operations underpinning the implementation of the herein described embodiments may be qualified as quantum safe to reduce the likelihood of foul play, for example.

As will be appreciated by the skilled artisan, different levels of device security measures may be required depending on the application at hand, level of security required, likelihood of tampering and the severity of potential consequences thereof.

Returning to the embodiment shown in FIG. 3, on the receiving end, a reconstitution engine 316 is provided to receive each encrypted copy 314A, 314B and configured to only reconstitute the original data 308A, 308B upon a certain comparative condition being met, such as that original data 308A and 308B are identical. If so, a reconstituted copy 318 of the original data will be released to the lower security level network. Otherwise, reconstitution will fail, and only encrypted copies of the original data will have been made accessible to the lower security level network.

Furthermore, each encrypted copy 314A, 314B will traverse the security zone boundary at the time its associated input is presented to the filter, i.e. at the transformation engine 312A, 31B where it has the transformation function applied to it. In some embodiments, as the transformation function does not retain any information about the data after the encrypted copy is released, no state is needed to be retained.

In the illustrated example, only two input sources are identified, whereby a successful transfer is only achieved upon each of the two input sources inputting identical data. In other embodiments, a greater number of input sources may be identified to each selectively input secure data into the filter 300. In some examples, a successful reconstitution may only occur upon identical inputs being received from each of the identified input sources (e.g. where a set number of input sources is predefined). This may be particularly relevant in systems where perfect multiple redundancy and/or input unanimity is preferred or required.

In other examples, a designated redundancy, unanimity, majority and/or sufficiency threshold may be defined such that successful reconstitution becomes possible upon a corresponding number of identical, or sufficiently comparable, distinctly sourced inputs being received as inputs to the filter 300.

Ultimately, in some embodiments, if enough encrypted copies are released by designated transformation engines, as dictated by an apriori-determined threshold (m), it is possible to reconstitute the original data by combining the encrypted copies via a reconstitution function/engine 316.

Otherwise, while the threshold is not met, in some embodiments, it is impossible to reconstitute the original data from the information found in the encrypted copies, and in some cases, it will be expected that the threshold will never be met if the inputs do not match.

Since the STCF is stateless, in some embodiments, an actor in the receiving security zone is responsible for accumulating the encrypted copies and reconstituting the original data if, and only if, the threshold is met (i.e., they receive at least m distinct, valid encrypted copies). This leads to a stable design that does not need to be modified based on the size of the input data or the number of simultaneous comparisons that must be supported, for example.

Furthermore, given that the function performed by each one of the nodes is generally stateless, once a decision/verdict is rendered by a node, it is forgotten.

Figure 4:
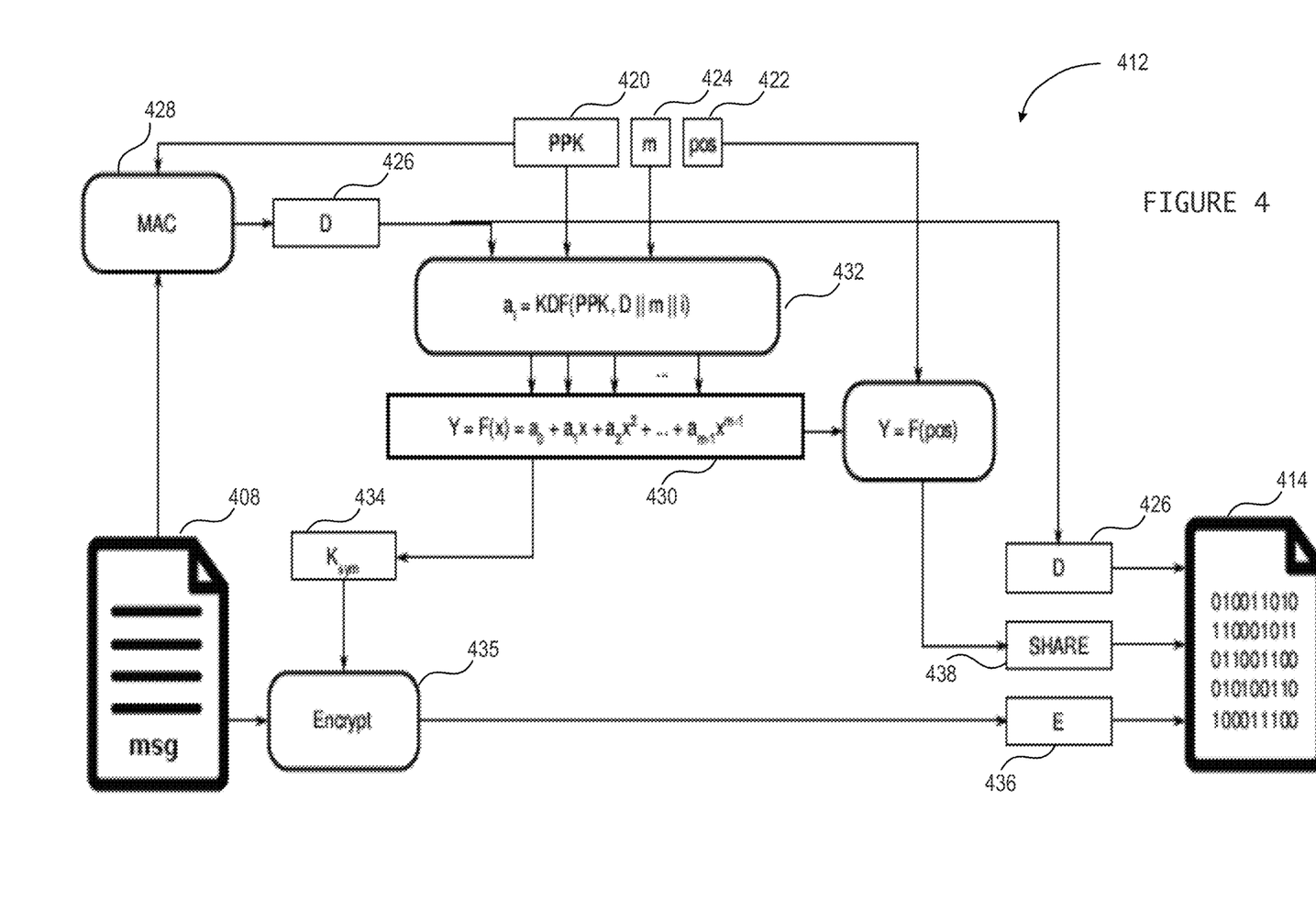
FIG. 4 is a diagram of an exemplary transformation process implemented within the context of a STCF, as shown for example in FIG. 3, in accordance with one embodiment.

With reference to FIG. 4, and in accordance with one embodiment, an exemplary transformation process, for example to be used within the context of a STCF as illustrated in FIG. 3 and generally referred to using the numeral 412, will now be described. In this example, the transformation function 412 creates an encrypted copy 414 from plaintext data 408. In this example, the transformation function was first initialized with a pre-placed key (PPK) 420, a position number (POS) 422 and a threshold parameter (m) 424.

In this particular example, for a system as illustrated in FIG. 3 that is based on this process to operate correctly, all transformation functions should be initialized with the same PPK 420 and threshold parameter 424. Also, each transform function should be initialized with a unique position number 422, which in this example is a positive non-zero integer.

In this particular example, once initialized with the PPK 420 and POS 422, the transform process can convert plaintext data 408 into an encrypted copy 414 using the following process.

A message authentication code (D) 426 of the plaintext data 408 is first computed using a cryptographically secure Message Authentication Code (MAC) function 428 (e.g., HMAC-SHA2-256) and the PPK 420.

Using the threshold parameter (m) 424, in this example, an equation 430 based on Shamir's secret sharing (i.e., m-of-n) is prepared in the form $Y=F(x)=a_0+a_1x^2+ \ldots +a_{m-1}x^{m-1}$, where m is the threshold parameter.

Each coefficient ($a_i$) in the secret sharing equation 430 is computed using a key derivation function (KDF) 432 based on the PPK 420, the MAC 428, the threshold parameter (m) 424 and the index (i) of the coefficient. This way, instead of generating the coefficients using a random number generator, the coefficients are computed in a deterministic manner such that any copy of the transformation function containing the PPK 420 and threshold (m) 424 will generate the same $a_i$ for the same input 408 (i.e. which would generate the same MAC 428).

In this example, the secret held by the sharing scheme ($a_0$) is used to create a symmetric key ($K_{sym}$) 434. The plaintext data 408 is then encrypted at 435 using $K_{sym}$, yielding an encrypted payload (E) 436.

A share 438 of the secret is generated by computing Y in the equation for the position (POS) 422, such that SHARE={F(POS)||POS||m}

In this example, the encrypted copy 414 is the concatenation of the message authentication code (D) 426, the share (SHARE) 438 and encrypted copy (E) 436. The encrypted copy 414 is then ready to be released to the output for further processing.

Figure 5:
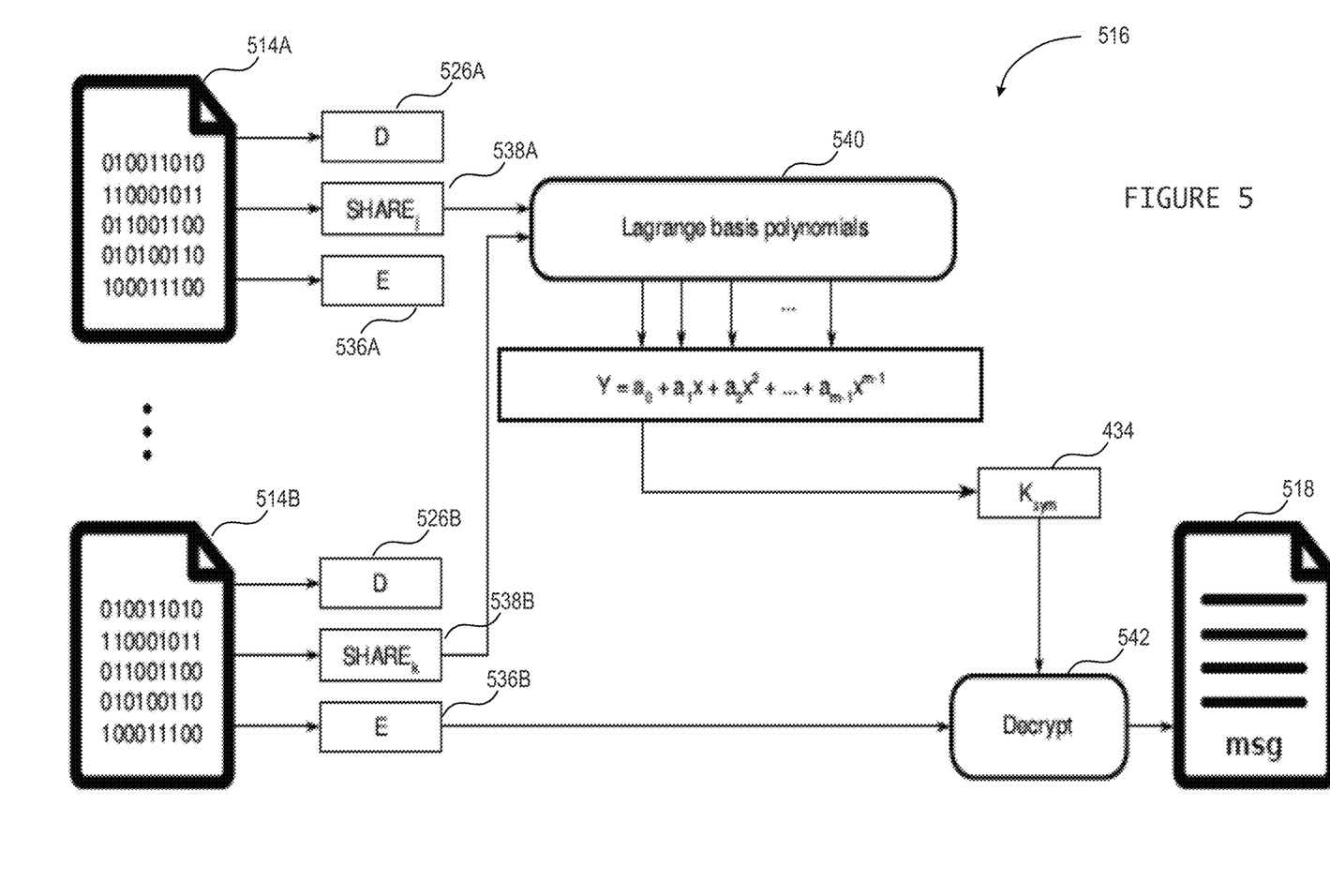
FIG. 5 is a diagram of an exemplary reconstitution process implemented on digital data transformed by the exemplary transformation process shown in FIG. 4, within the context of a STCF, as shown for example in FIG. 3, in accordance with one embodiment.

With added reference to FIG. 5, an in accordance with one embodiment, a reconstitution process, generally referred to using the numeral 516, will now be described. In this example, which follows from the transformation example described above with reference to FIG. 4, the original plaintext data 518 can be recovered using a Reconstitute Function under the following conditions.

At least m (i.e., the threshold) distinct valid encrypted copies 514A, 514B have been received from different Transformation Functions.

The encrypted copies were generated from the same plaintext 408, which, when using cryptographically secure functions, will result in identical MACs 428 (and vice-versa).

The actor wishing to obtain the plaintext data is responsible for accumulating and storing the encrypted copies 514A, 514B until a sufficient number are received (i.e. they may not all be received concurrently/simultaneously depending on the application at hand).

Each encrypted copy 514A, 514B will also contain, in this example: D (526A, 526B); a message authentication code of the plaintext based on the PPK 420; $SHARE_i$ (538A, 538B), which is {F(POS)||POS||m}; and E (536A, 536B), the original text encrypted under the shared secret key ($K_{sym}$) 434.

The actor can ascertain that enough information has been received by associating all encrypted copies 514A, 514B with the same D (526A, 526B) and counting the number of discrete shares available by verifying the number of different POS values against the threshold parameter m 424.

In this example, if enough shares are available then they can recover $K_{sym}$ 434 using Lagrange Basis Polynomials 540 to recover $a_0$ by solving the associated system of m linear equations in m unknowns. $K_{sym}$ is then used to decrypt E (536A, 536B, which should be identical in this example) at 542 back into the original plaintext 518. Note that, in this example, only the distinct D and SHARE values need all be kept, and only one corresponding copy of E is required to be retained. This can dramatically reduce the storage required on the actor if the original plaintext is very large (e.g., a multigigabyte firmware image or database, etc.).

Figure 6:
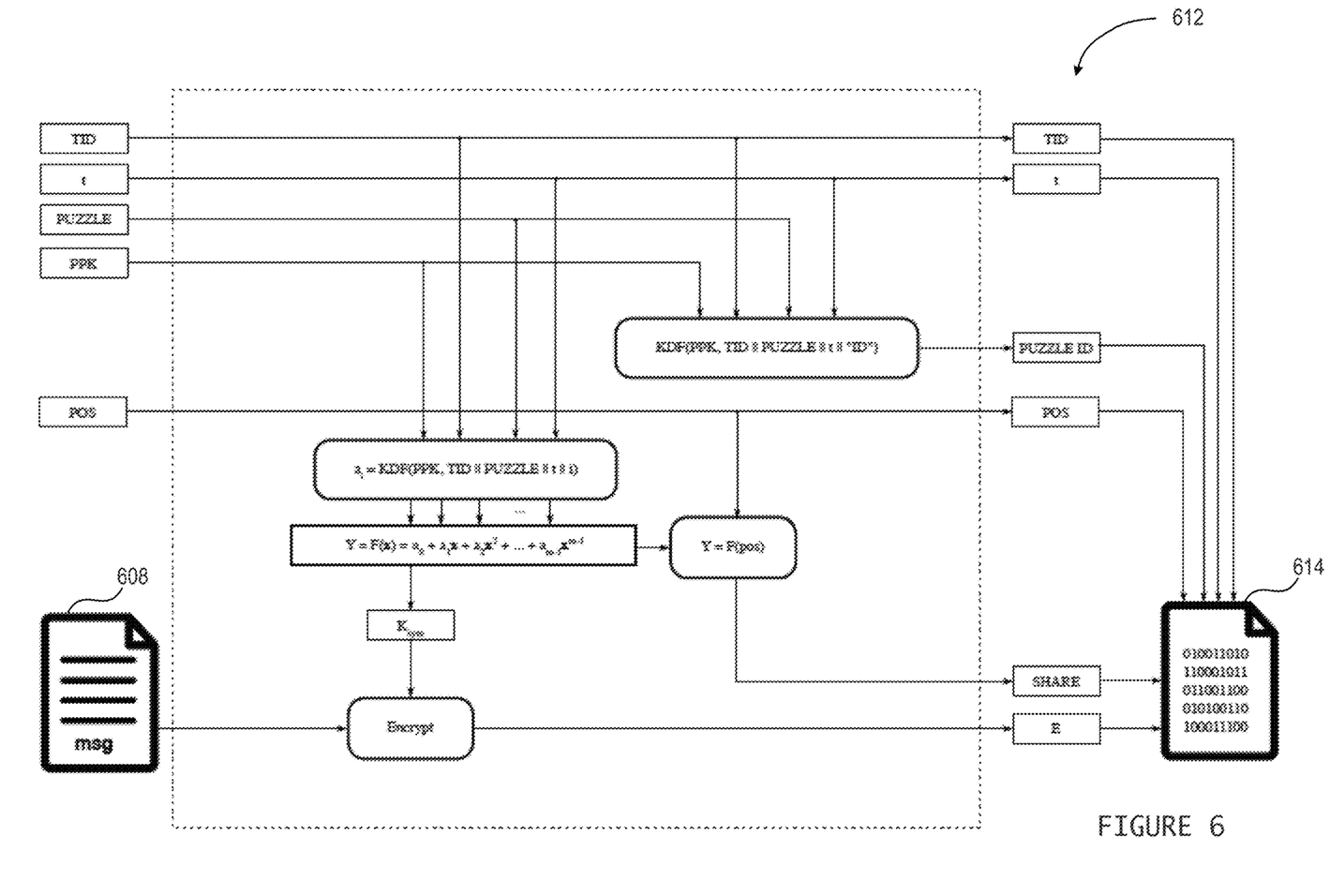
FIG. 6 is a diagram of a release agent operable to transform input digital data for the purposes of contributing to a trusted digital consensus verification system, in accordance with one embodiment.
Figure 7:
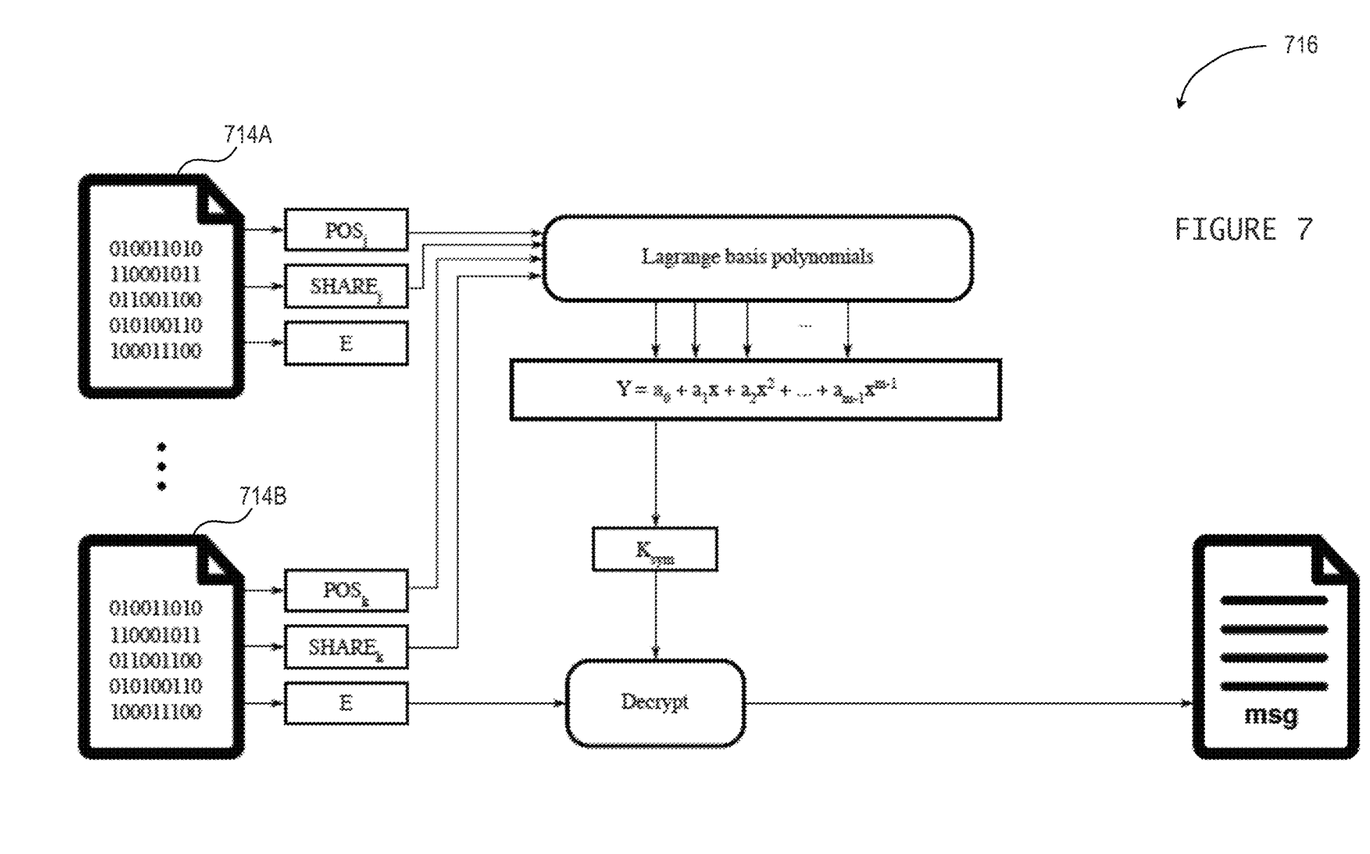
FIG. 7 is a diagram of a consensus agent operable to verify a consensus amongst a plurality of digital data inputs released by a distributed network of release agents as shown, for example, in FIG. 6, in accordance with one embodiment.

With reference to FIGS. 6 and 7, and in accordance with another embodiment, a trusted digital consensus verification system will now be described. In this embodiment, a release agent, generally referred to using the numeral 612, is operable to implement a secure transformation process that creates an encrypted copy 614 from plaintext data 608 to be reconstituted and released only upon being jointly processed with distinctly sourced but identical data inputs 714A, 714B by a downstream consensus verification agent 716. For instance, the original plaintext data 608 can be effectively compared in a secured and stateless manner amongst a plurality of distinctly sourced and respectively encrypted data versions for unanimity/consensus amongst sources and only released upon such unanimity/consensus being reliably verified. In the absence of such consensus, each sourced data versions will remain undecipherable by external parties and the consensus verification agent itself.

It will be appreciated that other systems and processes may be considered to fall within the scope of the present disclosure. For example, a similar approach could be applied to any one or more of an identity comparator, authenticity verification or confirmation, multi-node or multiparty discharge, release or clearance agents, clearance, i.e. where the release of information is contingent on one or more conditions being met.

Different applications may be considered for a STCF or release and consensus verification system, as described above, or like systems and methods. For example, as noted above, a STCF can prove useful in the domain of declassifying information, for example, where different sources or versions of the information must be aligned, and/or again where different agents required to authorize such declassification must unanimously (and possibly in an anonymous voting/authorization process) authorize the declassification under verified consensus. Other systems requiring high assurance redundancy techniques can also employ STCFs.

Other applications may also be considered where security zones are not at play, but where secure and optionally confidential unanimity/redundancy are required. The following provides one such example for contract negotiations over a public blockchain.

Figure 8:
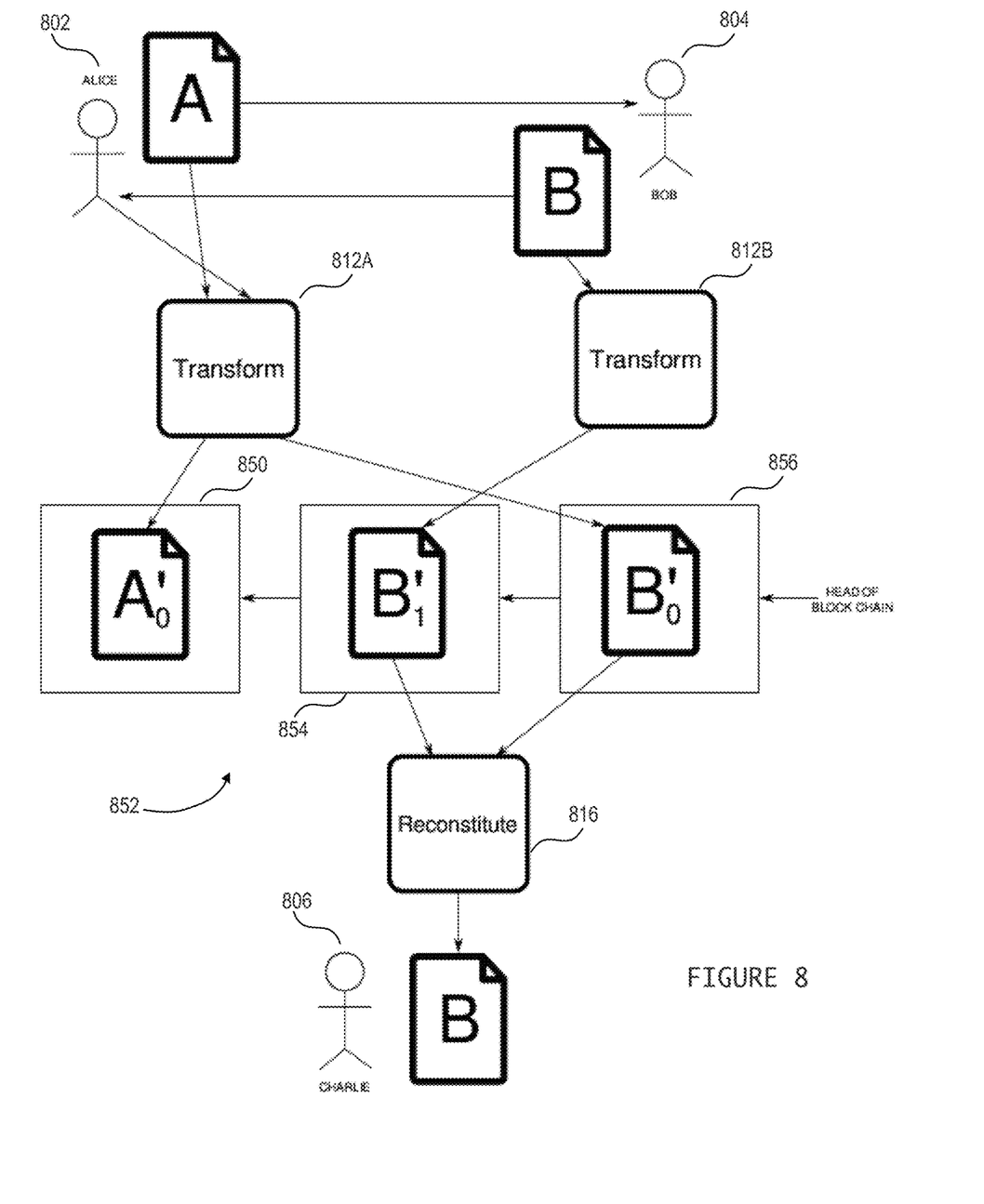
FIG. 8 is a schematic diagram of an application of a STCF as shown, for example, in FIG. 3, in which a contract is negotiated over a public blockchain and publicly released only upon a consensus having been reached between parties, in accordance with one embodiment.

Blockchain is a technology that is becoming prevalent with today's efforts to democratize trust online. It encourages distributed operations over a set of data that resist falsification over time. STCFs can be used to enable a set of parties to release information in a public forum (e.g., published on a blockchain) if and only if a threshold is achieved. Once that threshold/quorum is achieved, then the corresponding information is made public for all the world to see, such as in the case of a contract that is being negotiated between two parties named Alice 802 and Bob 804 in this example.

In this example Alice and Bob are negotiating a contract in private that they will ultimately disclose once negotiations are completed and the parties come to agreement. However, until that agreement is reached, the contract needs to remain confidential so that competitors such as Charlie 806 can't see the details of it before it is finished. STCFs can be used to enable this capability using the following steps.

Assume that Alice and Bob have access to respective transformation functions 612A, 612B initialized with a shared PPK, a threshold parameter of m=2, and agreed upon MAC/encryption algorithms. These transformation functions may, for example, be processed by respective secure encryption appliances such as respective hardware security modules (HSM), as referenced above.

In this example, Alice writes up an initial proposal (A) for Bob. She encrypts the proposal using her transformation device 812A and posts the result ($A_0'$) 850 on a public blockchain 852. She also sends a copy of A directly to Bob using some form of secure channel (encrypted email or file transfer, VPN, etc.).

Bob amends the proposal to create an updated version of the contract (B), which he transforms via device 812B to get the encrypted updated proposal $B_1'$. Like Alice, Bob publishes the encrypted updated proposal ($B_1'$) 854 on the public blockchain 652 and sends Alice a copy of B using some form of secure channel.

Alice agrees with the amended contract (B), transforms it via device 812A to generate $B_0'$, and posts $B_0'$ 856 to the public blockchain 852.

At that point, the content of the agreed upon contract (B) becomes available publicly as Charlie can extract all of the information that he needs to decrypt B from $B_0'$ and $B_1'$ using reconstitution engine/device 816. However, Charlie does NOT have sufficient information to recover A since only $A_0'$ was published and the threshold is 2. Hence, contract A will forever remain a mystery until Bob chooses to generate $A_1'$ and publish it on the public blockchain.

As noted above, various uses and applications can be considered for the herein-described embodiments. For example, the methods and systems as described herein may be applied to arrive at a consensus as to which block should be added to a given blockchain. For instance, each of the "voting" or "consensus" generating nodes could simply release their independently arrived at responses and once sufficient responses have been obtained to reach a consensus, then and only then would a block be added to an existing chain. A consensus generator of this nature could interface with a number of member nodes, such as in a blockchain construct, to arrive at a consensus on blocks to be added to the chain, for example.

In another example, independent agents, each equipped with trusted node devices, could be involved in the declassification or release of information or other group-wide decision requiring the agreement of a certain number (i.e. a threshold) of the members to arrive at that decision. For example, a United Nation like body of independent parties could each run an independent node and cast their vote or more complex answer to various debates in a highly trusted manner. The same consensus concept might apply to decision processes that might have severe consequences such as launching military offensives or even nuclear strikes. Once again, the "voting" process could be implemented in a completely secure and confidential manner until such time as a consensus (or majority) is reached, at which point, the result of the consensus (or majority) vote could be reconstituted and released.

In yet another example, an un-authenticated publicly visible document can be examined by independent authenticators, each running their own consensus generation capability and only after having received a certain threshold of votes might such a document be declared authentic.

In other words, the system can act in a multitude of ways where at times, the information is deemed private (or even classified) to start with and its release requires the collaboration and agreement of multiple parties that may belong to a single decision body or independent (and possibly competing) ones. In other cases, the information might be publicly available such as blocks of transactions in a blockchain context, documents on the internet, works of art, or other legal documents which might need multi-party consensus by a single body or multiple bodies in order to become viewed as legitimate documents/claims.

As detailed above, the embodiments as described herein may be operated to provide trusted, secure, and/or assured services, particularly when implemented based on a cryptographic process that can rely on a trusted HSM, and not a logical construct, for example. For instance, the advantage of a cryptographic process over a logical one is that a coding error in the cryptographic process is likely to generate an undecipherable output as opposed to possibly an inadvertent release, in the case of a logical process.

As further noted above, embodiments considered herein may provide for a secured and trusted distribution of release or transformation nodes which may, in some examples, represent nodes implemented on different cryptographic devices or in different geographic locations entirely. Accordingly, each of the nodes can be independently constructed, sourced, operated and/or controlled while still permitting the achievement of a secure and trusted consensus.

Furthermore, by defining application-specific parameters for the successful release of information, for example, different quorum-based, threshold, voting, decision, verdict, and/or consensus parameter and conditions can be set to suite such applications. Accordingly, the use of this technology can be applied to many fields.

While the present disclosure describes various embodiments for illustrative purposes, such description is not intended to be limited to such embodiments. On the contrary, the applicant's teachings described and illustrated herein encompass various alternatives, modifications, and equivalents, without departing from the embodiments, the general scope of which is defined in the appended claims. Except to the extent necessary or inherent in the processes themselves, no particular order to steps or stages of methods or processes described in this disclosure is intended or implied. In many cases the order of process steps may be varied without changing the purpose, effect, or import of the methods described.

Information as herein shown and described in detail is fully capable of attaining the above-described object of the present disclosure, the presently preferred embodiment of the present disclosure, and is, thus, representative of the subject matter which is broadly contemplated by the present disclosure. The scope of the present disclosure fully encompasses other embodiments which may become apparent to those skilled in the art, and is to be limited, accordingly, by nothing other than the appended claims, wherein any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims. Moreover, no requirement exists for a system or method to address each and every problem sought to be resolved by the present disclosure, for such to be encompassed by the present claims. Furthermore, no element, component, or method step in the present disclosure is intended to be dedicated to the public regardless of whether the element, component, or method step is explicitly recited in the claims. However, that various changes and modifications in form, material, work-piece, and fabrication material detail may be made, without departing from the spirit and scope of the present disclosure, as set forth in the appended claims, as may be apparent to those of ordinary skill in the art, are also encompassed by the disclosure.

What is claimed is:

1. A digital data comparator system for processing separate digital data inputs, the system comprising:
a digital data processor;
non-transitory computer-readable media having stored thereon machine-executable instructions that, when executed by said digital data processor, respectively implement computer-executable functions of two or more transformation engines, each having securely stored in association therewith a common key, a common designated comparator threshold number, and a respective identifier, wherein each of said transformation engines is operable to:
receive as input and encrypt a respective one of the separate digital data inputs using an encryption key derived from said common key, said common designated comparator threshold value and said respective one of the separate digital data inputs, and
output an encrypted copy, and partial encryption information associated with said encryption key and said respective identifier, wherein said partial encryption information comprises a key share of said encryption key derived via a designated secret sharing protocol; and
a reconstitution engine operable to access each said encrypted copy and said partial encryption information, and count access to identical encrypted copies as representative of identical digital data, wherein said reconstitution engine is operable, only upon said count reaching said common designated comparator threshold number, to:
process via said designated secret sharing protocol each said partial encryption information given each said respective identifier associated therewith to extract said encryption key; and
thereby successfully decrypt and release said identical digital data;
wherein each of said transformation engines is further operable to output a message authentication code representative of said respective one of the separate digital data inputs, and wherein said reconstitution engine is further operable to count access to identical encrypted copies by counting identical message authentication codes and only process each said partial encryption information upon said count reaching said common designated comparator threshold number.

2. The system of claim 1, wherein said reconstitution engine is operable to process each of said common designated comparator threshold number of said partial encryption information while only processing a single said encrypted copy commonly associated therewith for release.

3. The system of claim 1, wherein said encryption key comprises a symmetric key derived via said designated secret sharing protocol.

4. The system of claim 3, wherein said designated secret sharing protocol comprises Shamir's secret sharing protocol.

5. The system of claim 1, wherein said common key comprises a pre-placed key (PPK).

6. The system of claim 5, wherein said PPK is previously established between each of said two or more transformation engines via a designated group key agreement protocol.

7. The system of claim 1, wherein said reconstitution engine comprises a stateless engine such that said identical digital data remains encrypted and thereby inaccessible to and via said reconstitution engine unless said common designated comparator threshold number is satisfied.

8. The system of claim 1, wherein the system is operable between a higher digital security zone and a lower digital security zone, wherein each of said transformation engines receives one of the separate digital data inputs from within the higher digital security zone, and wherein said reconstitution engine is operable to release said identical digital data, once decrypted, to the lower digital security zone.

9. The system of claim 1, wherein said common designated comparator threshold number is designated to represent a majority or a unanimity amongst said distinct transformation engines and the separate digital data inputs.

10. The system of claim 9, wherein the separate digital data inputs are representative of respective digital votes such that said reconstitution engine releases a majority or a unanimity vote outcome only upon said majority or said unanimity being satisfied.

11. A computer-implemented process, to be automatically implemented by a hardware digital data processor, to digitally compare separate digital data inputs, the process comprising:
  for each of two or more distinctly implemented transformation processes:
    receiving as input a respective one of the separate digital data inputs;
    encrypting said respective one of the separate digital data inputs using an encryption key derived from a common key, a common designated comparator threshold value and said respective one of the separate digital data inputs; and
    outputting an encrypted copy and partial encryption information associated with said encryption key and a respective identifier, wherein said partial encryption information comprises a key share of said encryption key derived via a designated secret sharing protocol;
  counting access to identical encrypted copies as representative of identical digital data; and
  only upon said counting reaching said common designated comparator threshold number, reconstituting said identical digital data by:
    processing via said designated secret sharing protocol each said partial encryption information given each said respective identifier associated therewith to extract said encryption key; and
    decrypting and releasing said identical digital data using said extracted encryption keys;
  wherein, each of said transformation processes further comprises outputting a respective message authentication code representative of said respective one of the separate digital data inputs, and wherein said counting comprises, prior to said processing, counting identical message authentication codes until said count reaches said common designated comparator threshold number.

12. The process of claim 11, further comprising establishing said common key via a designated group key agreement protocol.

13. The process of claim 11, wherein each of said transformation processes are implemented within a higher network security zone; and wherein said reconstituting releases said identical digital data to a lower network security zone.

14. The process of claim 11, wherein said common designated comparator threshold number is designated to represent one of a majority or a unanimity amongst the separate digital data inputs.

15. A trusted digital consensus verification system comprising:
  a digital data processor;
  non-transitory computer-readable media having stored thereon machine-executable instructions that, when executed by said digital data processor, implement computer-executable functions of respective transformation engines each having stored in association therewith a common key and a respective identifier, wherein each of said transformation engines is operable to:
    receive as input and encrypt a respective digital data input version using an encryption key derived from said common key and said respective digital data input version, and
    output an encrypted copy representative of said respective digital data input version, and partial encryption information associated with said encryption key and said respective identifier, wherein said partial encryption information comprises a key share of said encryption key derived via a designated secret sharing protocol; and
  a reconstitution engine operable to access each said encrypted copy and said partial encryption information, wherein said reconstitution engine is operable, only upon each said encrypted copy of said digital data input versions being accessed representing an identical digital data version, to:
    process via said designated secret sharing protocol each said partial encryption information given each said respective identifier associated therewith to extract said encryption key; and
    decrypt and release said identical digital data version;
  wherein each of said transformation engines is further operable to output a message authentication code representative of said respective digital data input version, and wherein said reconstitution engine is further operable to compare and recognize identical message authentication codes and only process each said partial encryption information upon each said message authentication code being identical, thereby verifying consensus.

16. The system of claim 15, wherein said respective transformation engines output to a public blockchain, and wherein said reconstitution engine has access to said public blockchain to access each said partial encryption information therefrom and release said identical digital data version thereto or therefrom.

17. The system of claim 16, wherein each said respective digital data input version is representative of a digital contract version.

18. The system of claim 16, wherein said respective digital data input version is representative of a digital vote, identity or authentication.

19. The system of claim 16, wherein said encryption key comprises a symmetric key derived via said designated secret sharing protocol.

20. The system of claim 19, wherein said designated secret sharing protocol comprises Shamir's secret sharing protocol.

21. The system of claim 16, wherein said common key comprises a pre-placed key (PPK) previously established between each of said respective transformation engines via a designated group key agreement protocol.

22. A computer-implemented trusted digital consensus verification process, to be automatically implemented by a digital data processor, comprising:
  for each of respective distinctly implemented transformation processes:
    receiving as input a respective digital data input version;
    encrypting said respective digital data input version using an encryption key derived from a common key and said respective digital data input version, and
    outputting an encrypted copy representative of said respective digital data input version, and partial encryption information associated with said encryption key and a respective identifier, wherein said partial encryption information comprises a key share of said encryption key derived via a designated secret sharing protocol; and
  only upon each said encrypted copy of said digital data input versions being accessed representing an identical digital data version:
    processing via said designated secret sharing protocol each said partial encryption information given each said respective identifier associated therewith to extract said encryption key; and decrypting and releasing said identical digital data version accordingly;

wherein each of said transformation processes further comprises outputting a respective message authentication code representative of said respective digital data input version, and:

wherein the process further comprises, comparing and recognizing identical message authentication codes and only processing each said partial encryption information upon each said message authentication code being identical thereby verifying consensus.

\* \* \* \* \*

UNITED STATES PATENT AND TRADEMARK OFFICE
CERTIFICATE OF CORRECTION

| | | |
|---|---|---|
| PATENT NO. | : 11,921,867 B2 | |
| APPLICATION NO. | : 17/052962 | |
| DATED | : March 5, 2024 | |
| INVENTOR(S) | : Jean-Pierre Fiset | |

It is certified that error appears in the above-identified patent and that said Letters Patent is hereby corrected as shown below:

In the Claims

In Column 17, Claim 11, Line 31, delete "keys;" and insert --key;--.

Signed and Sealed this
Thirteenth Day of August, 2024

Katherine Kelly Vidal
*Director of the United States Patent and Trademark Office*